United States Patent Office 3,682,842
Patented Aug. 8, 1972

3,682,842
STABILIZED ENZYMIC COMPOSITIONS CONTAINING PROTEASE AND ALPHA AMYLASE OF BACTERIAL ORIGIN AND METHOD OF STABILIZING SUCH COMPOSITIONS
Irving Innerfield, 20 Knickerbocker Road,
Tenafly, N.J.
No Drawing. Filed May 4, 1970, Ser. No. 34,600
The portion of the term of the patent subsequent to Apr. 20, 1988, has been disclaimed
Int. Cl. C11d 1/12
U.S. Cl. 252—539
9 Claims

ABSTRACT OF THE DISCLOSURE

An enzymic composition of protease and alpha amylase of bacterial origin is stabilized against the loss of activity in the presence of water by combining the enzymes with a less than stoichiometric quantity of an enzyme-ion binding agent; and the shelf life of the stabilized enzymic composition is prolonged by adding thereto, in non-precipitating quantities, salt and at least one member of the group consisting of organic solvent and anionic detergent.

My U.S. Pat. No. 3,575,864, issued Apr. 20, 1971, describes and claims the stabilization of enzymic material consisting of a protease of animal origin in aqueous medium through the addition thereto of enzyme-ion binding agent, and at least two members of the group consisting of salt, protein, organic solvent and detergent.

BACKGROUND OF THE INVENTION

The invention relates to the stabilization of proteolytic and alpha amylolytic enzymes of bacterial origin against the loss of lytic activity in the presence of water and aims to provide a new cleansing composition that will exhibit lytic activity against both proteins and carbohydrates over an extended period of time even though it is stored under conditions which subject it to the presence of moisture or wherein it is incorporated in an aqueous medium. My new stabilized enzymic compositions are ideally suited for combination with anionic detergents for laundry and cosmetic use as stabilized liquid detergent preparations since an effective quantity of such detergents does not inhibit but indeed appears to enhance and further stabilize the enzyme action.

Proteolytic and alpha amylolytic enzymes are organic catalysts which, respectively, effect the hydrolysis of proteins and carbohydrates. It is known that, by their activity in reducing the size of protein and carbohydrate molecules, they can be availed of for use as cleansing agents and to augment the cleansing action of detergents. The proteolytic enzymes dissolve protein stains such as blood, egg and skin oils; whereas the alpha amylolytic enzymes attack the carbohydrates such as occur in gravy, chocolate and ice cream. The hydrolysis of protein and carbohydrate molecules effected by those enzymes converts the macromolecules to a reduced size in which they can be readily washed away by detergents or by water alone. However, the use of proteolytic and alpha amylolytic enzymes for such purpose has been severely limited because they normally lack stability in aqueous solutions or suspensions. To meet ordinary commercial requirements, the shelf life of a detergent preparation should be twelve or more months. The result has been that proteolytic and alpha amylolytic enzymes designed for laundry purposes have been marketed in dry form and even then in opened packages these enzymes absorb moisture and they have rapidly lost activity thereafter. Furthermore, the shelf life of desirable cosmetic preparations such as shampoos which contain proteolytic and alpha amylolytic enzymes has been far short of the twelve or more months required therefor. Hence, such past preparations could not be conveniently marketed.

It is known that proteolytic and alpha amylolytic enzymes can be precipitated out of aqueous solution by adding to such solution a sufficient quantity of a member of a class of compounds which are referred to hereinafter as "enzyme-ion binding agents." Exemplary thereof are trichloracetic acid, tungstic acid, phosphotungstic acid, tannic acid, sulfosalicyclic acid; and certain dyes such as methaline blue, saffronin and inuline scarlet. The quantity thereof that will precipitate enzyme out of aqueous solution is the amount which is at least the stoichiometric equivalent of enzyme which is in solution.

I have made the surprising discovery that the period during which proteolytic and alpha amylolytic enzymes, in the presence of each other, can retain effective lytic activity in aqueous medium at room temperature may be prolonged, without precipitating the enzymes out of solution in such medium, by combining with those enzymes a quantity of an enzyme-ion binding agent which is less than the stoichiometric equivalent of the enzymes to be stabilized. The more nearly the quantity of enzyme-ion binding agent approaches the stoichiometric equivalent of the enzymes to be stabilized, the more effective it appears to be. The shelf life of the enzymes which have been thus stabilized can be extended for a further period of sufficient length to meet marketing requirements by including in the aqueous solution thereof, in small quantity, a salt and one or both of an organic solvent and an anionic detergent. The stabilized enzymic composition thus prepared is an effective cleansing preparation, with a wide range of applications, especially when one of the components is an anionic detergent.

SUMMARY

The proteolytic-alpha amylolytic enzymes that I employ in the practice of my invention are of bacterial origin. Exemplary thereof are the proteolytic and alpha amylolytic enzymes obtained from Bacillus subtilis, Bacillus mesentericus, Bacillus polymyxa and Bacillus macerans. The ratio of proteolytic:alpha amylolytic enzyme employed in the practice of my invention is not critical so long as each is present in an effective amount in terms of lytic activity. I have found that enzymic material of bacterial origin containing, in terms of lytic activity per mg., protease exhibiting from 0.5 to 3 Northrop units, and alpha amylase exhibiting from 400 to 1200 Wohlgemuth units functions very satisfactorily. I have discovered that both such enzymes can be stabilized together during storage at room temperature for upwards of twelve months, in an aqueous medium, with retention of about 80–85% of their original lytic activities, by combining with those enzymes a slightly less than stoichiometrically equivalent quantity of an enzyme-ion binding agent and including with that combination: (1) salt, and (2) at least one member of the group consisting of organic solvent and anionic detergent, in quantities which will not precipitate the enzymic material out of solution.

Exemplary of the salts that can be used in the practice of my invention are: sodium chloride, ammonium sulfate, sodium sulfate, magnesium sulfate, sodium phosphate, lithium bromide and sodium tannate. Typical organic solvents are: ethanol, methanol, acetone, sugar alcohols, linear alcohols, carbocyclic alcohol and glycol. Anionic detergents that can be used in the practice of my invention include: alkylaryl sulfonate, the sodium salts of synthetic lauryl sulfonates (e.g., the products marketed by Witco Chemical Company as Ultrasulfonate SE 5, Ultrasulfonate SL 1 and Ultrasulfonate AE 3), benzene sulfonate, triethanolamine sulfonate and ammonium salt of sulfate monoglyceride.

The aqueous medium containing the proteolytic and alpha amylolytic enzymes stabilized in accordance with my invention is maintained at a pH within the range of about 7.0 to about 9.5, preferably 7.5 to 8.5, and is most desirably of high ionic strength and has a low dielectric constant.

The addition of anionic detergent to my stabilized aqueous proteolytic-alpha amylolytic enzyme preparation which contains organic solvent as a component of the stabilizing system may produce separation into phases on standing. This is particularly likely when (a) such stabilized aqueous enzymic preparation contains a quantity of salt which is in excess of about 7% of the stabilized aqueous enzymic composition; and (b) the ratio of stabilized aqueous enzymic preparation to anionic detergent is less than 1. Such phase separation can be prevented through the addition to the preparation of a small quantity (1% or a fraction thereof is usually ample) of a surface-active agent such as "Tween 40," "Tween 60," "Tween 80" and "Triton."

In order that my invention may be fully available to those skilled in the art, the following examples of compositions containing protease-alpha amylase of bacterial origin, stabilized against loss of lytic activity in an aqueous medium pursuant to my invention, are given:

EXAMPLE I

Laundry pre-soak formulation

| | Percent |
|---|---|
| Enzyme (substantially equal parts of protease-alpha amylase derived from B. subtilis) | 3 |
| Salt (sodium chloride) | 25 |
| Solvent (methyl alcohol) | 5 |
| Enzyme-ion binding agent (trichloroacetic acid) | 0.01 |
| Water | 67 |

EXAMPLE II

Stabilized enzymic detergent

| | Percent |
|---|---|
| Enzyme (substantially equal parts of protease-alpha amylase derived from B. subtilis) | 1.5 |
| Salt (sodium chloride) | 12.5 |
| Organic solvent (ethyl alcohol) | 2.5 |
| Enzyme-ion binding agent (trichloracetic acid) | 0.01 |
| Anionic detergent (alkylaryl sulfonate) | 17.5 |
| Surface-active agent | 0.5 |
| Water | 65.5 |

EXAMPLE III

Stabilized enzymic detergent

| | Percent |
|---|---|
| Enzyme (substantially equal parts of protease-alpha amylase derived from B. subtilis) | 1.5 |
| Salt (sodium chloride) | 25 |
| Organic solvent (ethyl alcohol) | 5 |
| Enzyme-ion binding agent (trichloracetic acid) | 0.01 |
| Anionic detergent (alkylaryl sulfonate) | 12.5 |
| Surface-active agent | 1 |
| Water | 55 |

EXAMPLE IV

Stabilized enzymic detergent

| | Percent |
|---|---|
| Enzyme (substantially equal parts of protease-alpha amylase derived from B. subtilis) | 1.5 |
| Salt (sodium chloride) | 7 |
| Enzyme-ion binding agent (trichloracetic acid) | 0.01 |
| Anionic detergent (alkylaryl sulfonate) | 17.5 |
| Surface-active agent | 0.5 |
| Water | 73.5 |

EXAMPLE V

Shampoo

| | Percent |
|---|---|
| Enzyme (substantially equal parts of protease-alpha amylase derived from B. subtilis) | 3 |
| Salt (sodium chloride) | 4 |
| Organic solvent (methyl alcohol) | 10 |
| Anionic detergent (sodium salt of lauryl ether sulfonate) | 5 |
| Water | 78 |

What I claim is:

1. A stabilized enzymic composition consisting essentially of the combination, in an aqueous medium, with protease and alpha amylase of bacterial origin, of a quantity of enzyme-ion binding agent selected from the group consisting of trichloracetic acid, tungstic acid, phosphotungstic acid, tannic acid, sulfosalicylic acid and dyes selected from the group consisting of methaline blue, safronin and inuline scarlet which is slightly less than the stoichiometric equivalent of said enzymic material, and stabilizing nonprecipitating quantities of water-soluble salt and organic solvent for the enzymes.

2. A stabilized enzymic composition as claimed in claim 1 including a non-precipitating quantity of anionic detergent.

3. A stabilized enzymic composition as claimed in claim 2 including a non-ionic surface-active agent.

4. A stabilized enzymic composition as claimed in claim 1 wherein said enzyme-ion binding agent is trichloracetic acid.

5. A stabilized enzymic composition as claimed in claim 2 wherein said anionic detergent is alkylaryl sulfonate.

6. A stabilized enzymic composition consisting essentially of the combination, in an aqueous medium, with protease and alpha amylase of bacterial origin, of a quantity of enzyme-ion binding agent selected from the group consisting of trichloracetic acid, tungstic acid, phosphotungstic acid, tannic acid, sulfosalicylic acid and dyes selected from the group consisting of methaline blue, safronin and inuline scarlet which is slightly less than the stoichiometric equivalent of said enzymic material, and stabilizing non-precipitating quantities of water-soluble salt and anionic detergent.

7. The method of stabilizing protease and alpha amylase of bacterial origin in the presence of each other in an aqueous medium which comprises combining therewith a quantity of enzyme-ion binding agent selected from the group consisting of trichloracetic acid, tungstic acid, phosphotungstic acid, tannic acid, sulfosalicyclic acid and dyes selected from the group consisting of methaline blue, safronin and inuline scarlet which is slightly less than the stoichiometric equivalent of said enzyme, a stabilizing, non-precipitating quantity of a water soluble salt, and at least one stabilizing member of the group consisting of organic solvent and anionic detergent in non-precipitating quantities.

8. The method of stabilizing protease and alpha amylase of bacterial origin as claimed in claim 7 wherein said stabilizing member consists of a nonprecipitating quantity of organic solvent.

9. The method of stabilizing protease and alpha amylase of bacterial origin as claimed in claim 7 wherein said stabilizing member consists of a non-precipitating quantity of anionic detergent.

References Cited

UNITED STATES PATENTS

| | | |
|---|---|---|
| 2,343,136 | 2/1944 | Dobson et al. |
| 3,252,948 | 5/1966 | Manecke et al. _____ 195—68 |
| 3,272,717 | 9/1966 | Fukumoto et al. _____ 195—68 |
| 3,519,479 | 7/1970 | Blomeyer et al. |
| 3,519,538 | 7/1970 | Messing et al. _____ 195—63 |

OTHER REFERENCES

"Nature," vol. 215, July 22, 1967. pp. 417–419.

HERBERT B. GUYNN, Primary Examiner

W. SCHULZ, Assistant Examiner

U.S. Cl. X.R.

195—63; 252—89, 135, 540, 558, 559, Digest #12